US009275627B2

(12) United States Patent
Schoerkmaier

(10) Patent No.: US 9,275,627 B2
(45) Date of Patent: Mar. 1, 2016

(54) CLOSED LOOP CONTROL SYSTEM FOR ACTIVE NOISE REDUCTION AND METHOD FOR ACTIVE NOISE REDUCTION

(75) Inventor: Martin Schoerkmaier, Graz (AT)

(73) Assignee: AMS AG, Unterpremstaetten (AT)

( * ) Notice: Subject to any disclaimer, the term of this patent is extended or adjusted under 35 U.S.C. 154(b) by 221 days.

(21) Appl. No.: 14/002,110

(22) PCT Filed: Jan. 25, 2012

(86) PCT No.: PCT/EP2012/051152

§ 371 (c)(1), (2), (4) Date: Oct. 31, 2013

(87) PCT Pub. No.: WO2012/119808

PCT Pub. Date: Sep. 13, 2012

(65) Prior Publication Data

US 2014/0051483 A1 Feb. 20, 2014

(30) Foreign Application Priority Data

Mar. 8, 2011 (DE) ......................... 10 2011 013 343

(51) Int. Cl.

*H04B 15/00* (2006.01)
*G10K 11/175* (2006.01)
(Continued)

(52) U.S. Cl.

CPC .......... *G10K 11/175* (2013.01); *G10K 11/1784* (2013.01); *H04R 1/1083* (2013.01);
(Continued)

(58) Field of Classification Search

CPC ............. B60N 2002/4405; B60N 2/24; B60N 2/4879; B60N 2/643; G10K 11/175; G10K 11/1784; G10K 2210/1081; G10K 2210/3026; G10K 2210/3027; G10K 2210/3055; H04R 1/1083; H04R 2460/01
USPC ............. 381/71.6, 71.7, 71.11, 74, 94.1, 94.9
See application file for complete search history.

(56) References Cited

U.S. PATENT DOCUMENTS 5,251,263 A * 10/1993 Andrea et al. ............... 381/71.6
5,675,658 A * 10/1997 Brittain ........................... 381/72
(Continued)

FOREIGN PATENT DOCUMENTS

DE 10 2007 0130719 A1 9/2008
EP 1 921 602 A2 5/2008
(Continued)

OTHER PUBLICATIONS

Kuo, Sen M. et al., "Active Noise Control: A Tutroial Review", Proceedings of the IEEE, vol. 87, No. 6, Jun. 1999, pp. 943-973.
(Continued)

*Primary Examiner* — Vivian Chin
*Assistant Examiner* — Friedrich W Fahnert
(74) *Attorney, Agent, or Firm* — McDermott Will & Emery LLP

(57) ABSTRACT

The invention relates to a closed loop control system for active noise reduction, comprising a speaker and an adding device connected to the speaker. A feedforward control and a feedback control each comprise a microphone for recording noise interference or for recording a sound output by the speaker. Control networks for forming a corresponding control parameter are coupled to the corresponding microphones and are connected to the adding device at the output side thereof. According to the invention, the feedback control for noise reduction is adapted on the basis of a first acoustic ratio and the feedforward control for noise reduction is adapted on the basis of a second acoustic ratio. The control network of the feedback control is designed to at least partially compensate for the control parameter of the feedforward control when current acoustic ratios change in the direction of the first acoustic ratio.

20 Claims, 6 Drawing Sheets

(51) Int. Cl.
*G10K 11/178* (2006.01)
*H04R 1/10* (2006.01)

(52) U.S. Cl.
CPC *G10K2210/1081* (2013.01); *G10K 2210/3026* (2013.01); *G10K 2210/3027* (2013.01); *G10K 2210/3055* (2013.01); *H04R 2460/01* (2013.01)

(56) References Cited

U.S. PATENT DOCUMENTS

| | | | | |
|---|---|---|---|---|
| 6,396,930 | B1 * | 5/2002 | Vaudrey et al. | 381/60 |
| 6,418,227 | B1 * | 7/2002 | Kuo | 381/71.11 |
| 7,103,188 | B1 * | 9/2006 | Jones | 381/71.9 |
| 8,848,935 | B1 * | 9/2014 | Massie et al. | 381/71.1 |
| 2004/0264706 | A1 * | 12/2004 | Ray et al. | 381/71.11 |
| 2008/0112570 | A1 * | 5/2008 | Asada et al. | 381/71.6 |
| 2009/0034748 | A1 * | 2/2009 | Sibbald | 381/71.6 |
| 2009/0080670 | A1 * | 3/2009 | Solbeck et al. | 381/71.6 |
| 2009/0245529 | A1 * | 10/2009 | Asada et al. | 381/71.6 |
| 2010/0046766 | A1 | 2/2010 | Gregg et al. | |
| 2010/0105447 | A1 * | 4/2010 | Sibbald | G10K 11/1788 455/570 |
| 2010/0150367 | A1 * | 6/2010 | Mizuno | 381/71.6 |
| 2010/0166203 | A1 | 7/2010 | Peissig et al. | |
| 2011/0007907 | A1 | 1/2011 | Park et al. | |
| 2011/0044464 | A1 | 2/2011 | Sapiejewski et al. | |
| 2011/0206214 | A1 * | 8/2011 | Christoph et al. | 381/71.6 |
| 2011/0299695 | A1 * | 12/2011 | Nicholson | 381/71.6 |
| 2013/0129105 | A1 * | 5/2013 | Hua | 381/71.6 |

FOREIGN PATENT DOCUMENTS

| | | | |
|---|---|---|---|
| GB | 2 449 083 | A | 11/2008 |
| GB | 2 484 722 | A | 4/2012 |
| JP | 2010-081495 | A | 4/2010 |
| WO | 2009/134107 | A2 | 11/2009 |
| WO | 2010/124176 | A1 | 10/2010 |

OTHER PUBLICATIONS

Ray, Laura R. et al., "Hybrid Feedforward-Feedback Active Noise Reduction for Hearing Protection and Communication", J. Acoustic Society of America, vol. 120, No. 4, Oct. 2006, pp. 1-10.

* cited by examiner

CLOSED LOOP CONTROL SYSTEM FOR ACTIVE NOISE REDUCTION AND METHOD FOR ACTIVE NOISE REDUCTION

The present invention pertains to a closed loop control system for active noise reduction, particularly for a mobile telephone, and a method for active noise reduction.

In mobile telephony, ambient noise at the ear of a user or listener frequently interferes with the acoustic reception at the ear such that the listening comprehension is diminished. This is the reason why there is an increased demand for so-called active noise reduction systems that are also referred to as ANC systems [or] “Active Noise Cancellation Systems.” One common aspect of these systems is that they respectively suppress interfering ambient noise in the region of the loudspeaker or at the ear of a listener in a predetermined frequency band. An active noise cancellation system of this type is known, for example, from document GB 2449083 A.

Figure 10:
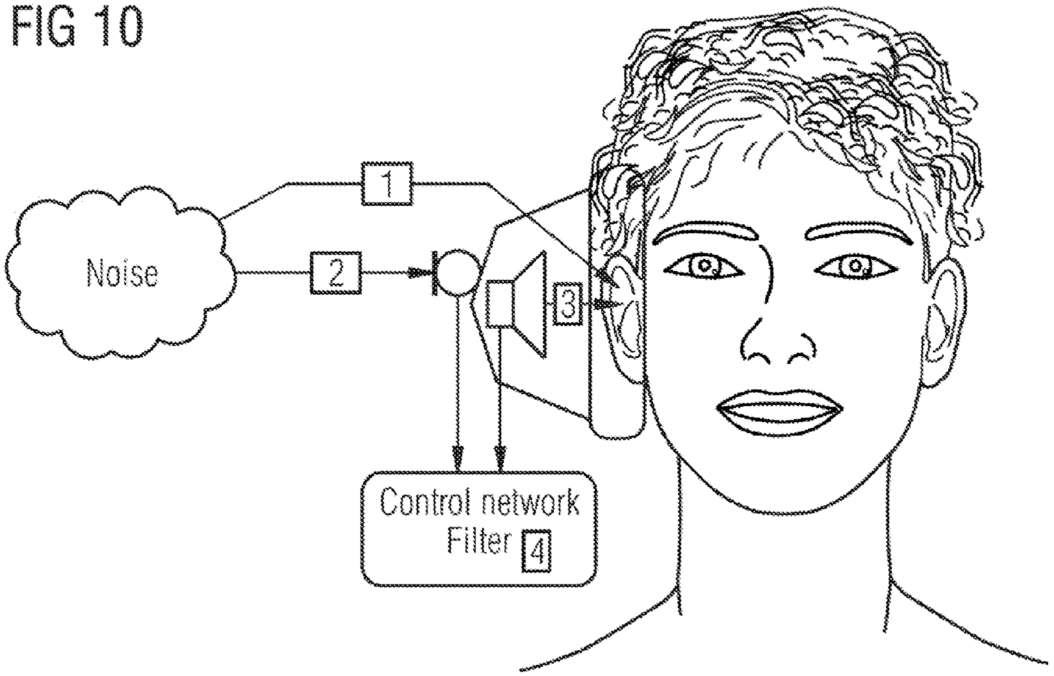

Similar to FIG. 10, this document describes a so-called feedforward control. In a feedforward control, the noise in a path 2 is received by means of a microphone and processed in a control network with filters 4 in order to be output by a loudspeaker. The processing is carried out in such a way that the noise interference is inverted with respect to its phase in a frequency range. The thusly inverted signal being output by the loudspeaker interferes with the noise that reaches the ear via the path 1 in order to suppress undesirable noise.

Figure 11:
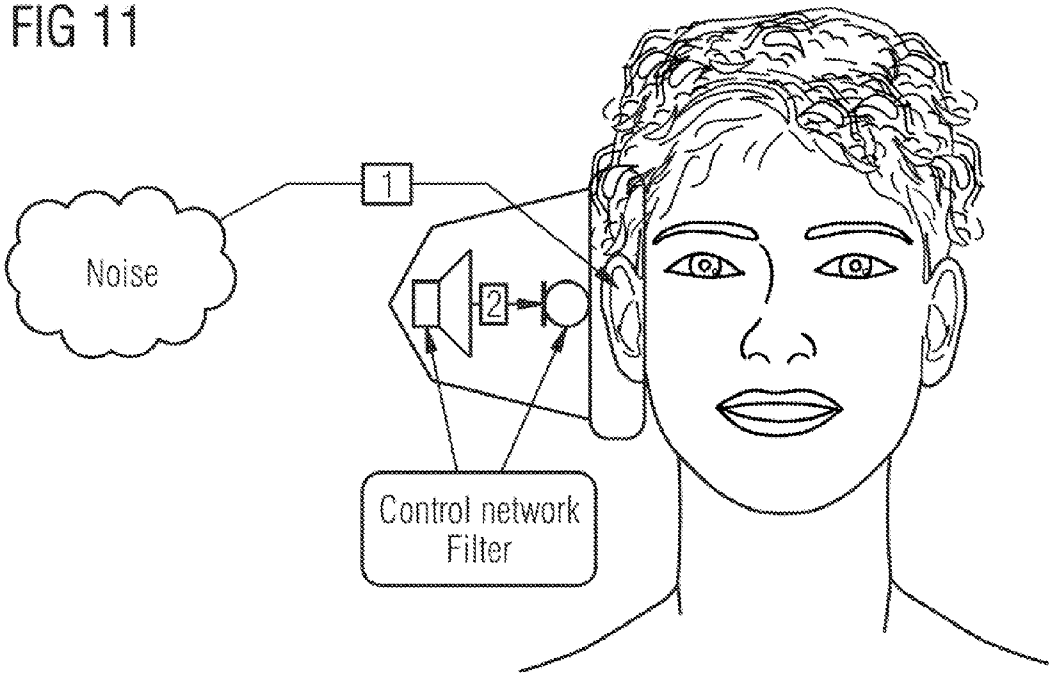

Alternatively, feedback control systems could conceivably also be used instead of a feedforward control. FIG. 11 shows such an example, in which a microphone that forms part of a feedback control is arranged in the vicinity of a loudspeaker and receives the signal in the path 2. The loudspeaker ideally also reproduces a microphone signal that is phase-shifted by 180° and adapted to the noise interference incident via the path 1 with respect to its amplitude.

In both cases, the inverse phase position in connection with a controlled amplitude of the loudspeaker signal leads to a destructive interference with the original noise signal and consequently a suppression thereof. In this case, it is essential that the loudspeaker housing in both cases tightly adjoin the ear as indicated such that a known or easily reproducible and therefore stable acoustic ratio is adjusted.

One essential factor for this are [sic] the transfer functions of the loudspeaker used, the microphones and the external parameters because these can be imitated by means of filters that form part of the control system. The cases shown frequently concern a headset system that can be assumed to be relatively stable and invariable. In this way, a feedforward control or feedback control can be tuned to a known and well predefined acoustic ratio such that an adequate suppression is generally also achieved.

However, the situation becomes more problematic in cases in which no stable acoustic ratios exist. In mobile communications, this is the case, for example, when a user of a mobile telephone holds the mobile telephone against the ear more or less steadily. Consequently, no fixed and predefined coupling between the loudspeaker system and the ear of the user exists. In fact, the acoustic ratios and, in particular, the tightness of the seal between the loudspeaker and the ear are highly variable. Since this tightness moreover represents an essential aspect in the tuning of a control system for active noise reduction, the variable acoustic ratios regularly lead to a distinct deterioration. One option for counteracting these variable acoustic ratios is the design of adaptive control systems, for example, with an adapter filter. However, the realization of these systems is very elaborate in analog technology and correspondingly expensive in digital technology.

Consequently, there still is a need for a closed loop control system for active noise reduction, particularly for mobile telephones or other loudspeaker systems, which also makes it possible to achieve an adequate noise reduction under variable and changing acoustic ratios with low power and manufacturing costs.

This need is fulfilled with the closed loop control system and the method for active noise reduction.

According to the invention, it is proposed to implement a feedforward control and a feedback control, both of which are tuned to different acoustic ratios, in a closed loop control system. The two controls are coupled to one another in such a way that at least one control compensates the other control during a corresponding change of the acoustic ratios.

It is advantageous to respectively tune the two controls to one extreme of the potential acoustic ratios. For example, it is advantageous to tune the feedback control to a predefined fixed acoustic ratio that essentially corresponds to a tight seal between the loudspeaker and an ear of a user. The feedback control therefore is tuned in such a way that it provides an adequate noise reduction over the frequency range if a tight seal and a predefined fixed air volume exist. The feedforward control, in contrast, is tuned to a different acoustic ratio that corresponds, for example, to a completely untight seal between the loudspeaker and the ear of the user. The tuning of the two controls to these two extremes therefore makes it possible to achieve a compensation of one control by means of the other control when the acoustic ratios change from one extreme to the other extreme.

In this way, an adequate noise reduction can be realized over a broad range of potential acoustic ratios. The inventive control system therefore is particularly suitable for mobile communications, in which the acoustic ratios depend, in particular, on user mannerism.

In one exemplary embodiment of the invention, a control system comprises a loudspeaker and an adding device, to which the loudspeaker is connected. The adding device features a first and a second input. The control system further comprises a feedforward control with a first microphone for receiving noise interference, as well as a control network that is connected thereto and features at least one filter for forming a first controlled variable. On its output side, the first control network is coupled to the adding device in order to supply the first controlled variable. The control system further features a feedback control with a second microphone for receiving a sound being output by the loudspeaker. A second control network implemented in the feedback control features at least one filter for forming a second controlled variable and is coupled to the second microphone on its input side. On its output side, the second control network is also connected to the adding device.

According to the invention, it is proposed to tune the feedback control to a noise reduction based on a first acoustic ratio, particularly a predetermined fixed acoustic ratio. The feedforward control, in contrast, is tuned to a noise reduction based on a second acoustic ratio that is not fixed, particularly an open ratio.

The adding device for adding the two controlled variables makes it possible to at least partially compensate the first controlled variable when the current acoustic ratios change in the direction of the first acoustic ratio.

In one embodiment, the first acoustic ratio advantageously corresponds to an essentially tight seal between the loudspeaker and an ear of a user. Alternatively, the first acoustic ratio comprises an essentially fixed air volume such that the tunability is simplified. The second acoustic ratio, in contrast, corresponds to an untight seal between the loudspeaker and an ear of a user. The air column that therefore exists between the loudspeaker and the ear of the user is, in contrast to the first fixed acoustic ratio, variable at the second open acoustic ratio, but at least significantly larger than the air volume at the first fixed acoustic ratio.

Alternatively, the first fixed acoustic ratio also corresponds to a first distance between the loudspeaker and the eardrum of the user while the second open acoustic ratio corresponds to a second distance and a second direction between the loudspeaker and the ear of the user. The second distance is in particular greater than the first distance.

For example, it is proposed that the first acoustic ratio correspond to a first extreme value of potential acoustic ratios and the second acoustic ratio correspond to a second extreme value of the potential acoustic ratios.

The tuning of the feedforward control and the feedback control preferably cannot be changed at least during the operation of the control system.

For example, the first and the second control network are based on an entirely analog control.

In one embodiment, the first and/or the second control network has control characteristics that are tuned to the respective acoustic ratio, particularly a tuned variable gain amplification.

In an enhancement of the invention, the control system comprises a loudspeaker housing for accommodating the loudspeaker, which essentially encloses a first air volume. An auxiliary housing with essentially a second air volume is arranged in a preferred direction for the sound radiation of the loudspeaker housing. In one embodiment, the fixed acoustic ratio is defined by the first and the second air volume.

The second microphone that forms part of the feedback control may also be installed in the auxiliary housing. The second control network therefore can be tuned to a noise reduction that is based on the first and the second air volume. Accordingly, the first control network is tuned to a noise reduction that is based on a significantly larger air volume than the first and the second air volume. In a method for active noise reduction, a feedback control, as well as a feedforward control, is provided for the noise reduction. The feedback control is in this case tuned to a first acoustic ratio and the feedforward control is tuned to a second acoustic ratio. In order to realize the active noise reduction, a controlled variable of the feedforward control is compensated by a controlled variable of the feedback control when the current acoustic ratios change in the direction of the first acoustic ratio.

For example, the second and the first acoustic ratio may be defined by corresponding distances between the loudspeaker or a reference point and the ear of a user. If this distance changes, for example, such that it becomes shorter, a variable gain amplification of the feedforward control is therefore compensated by the variable gain amplification of the feedback control.

Other aspects and embodiments of the invention result from the dependent claims. Several exemplary embodiments of the invention are described in greater detail below with reference to the drawings.

Figure 1:
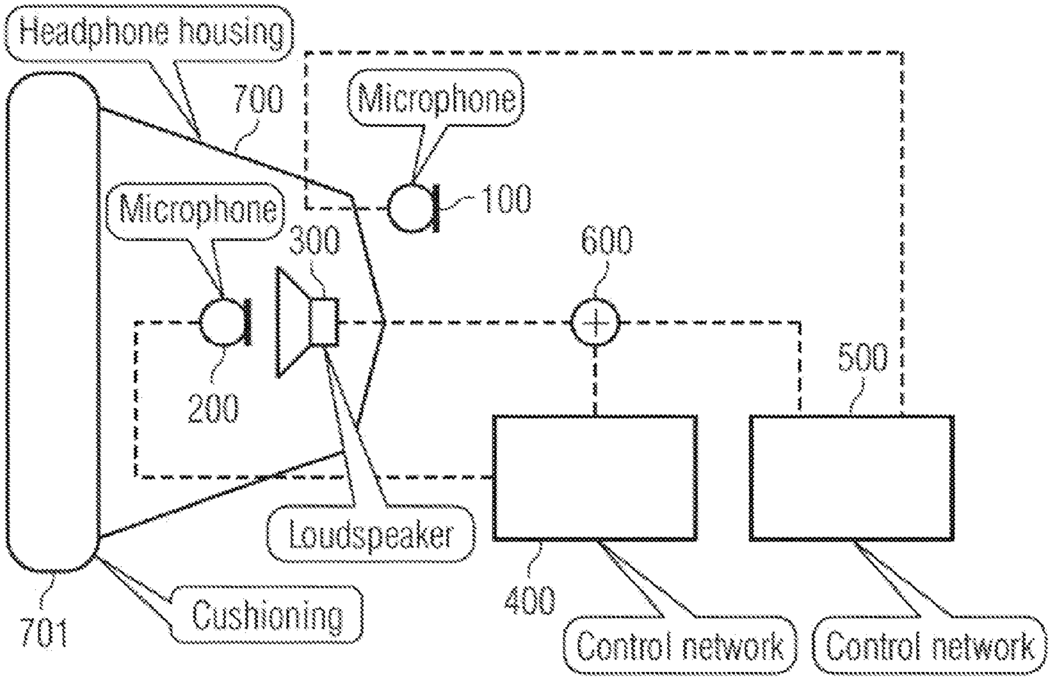
Figure 2:
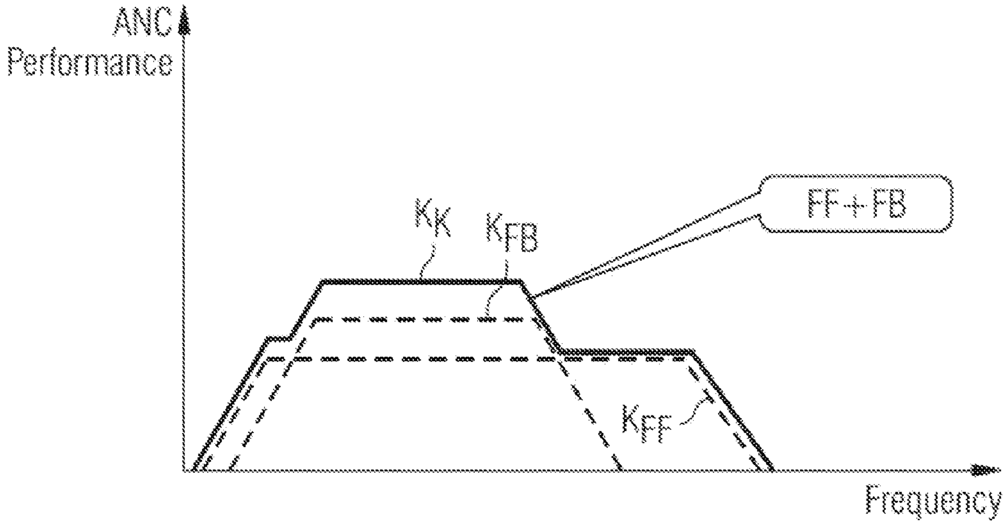
Figure 3:
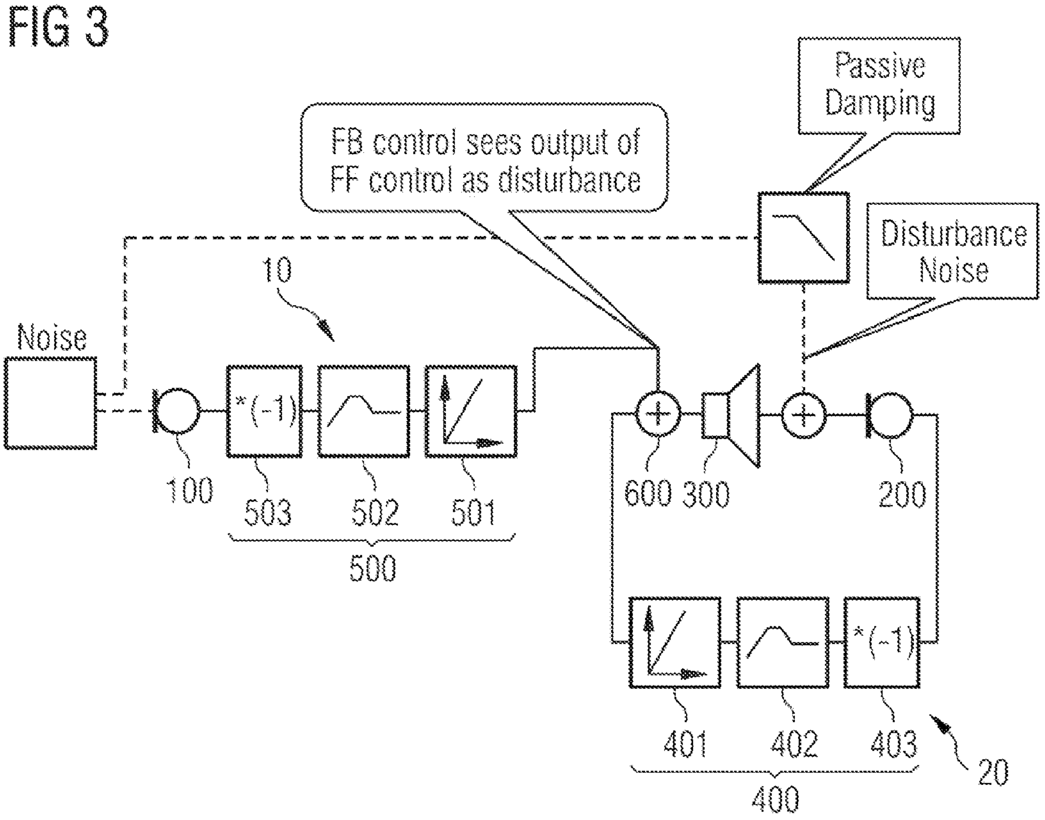
Figure 4:
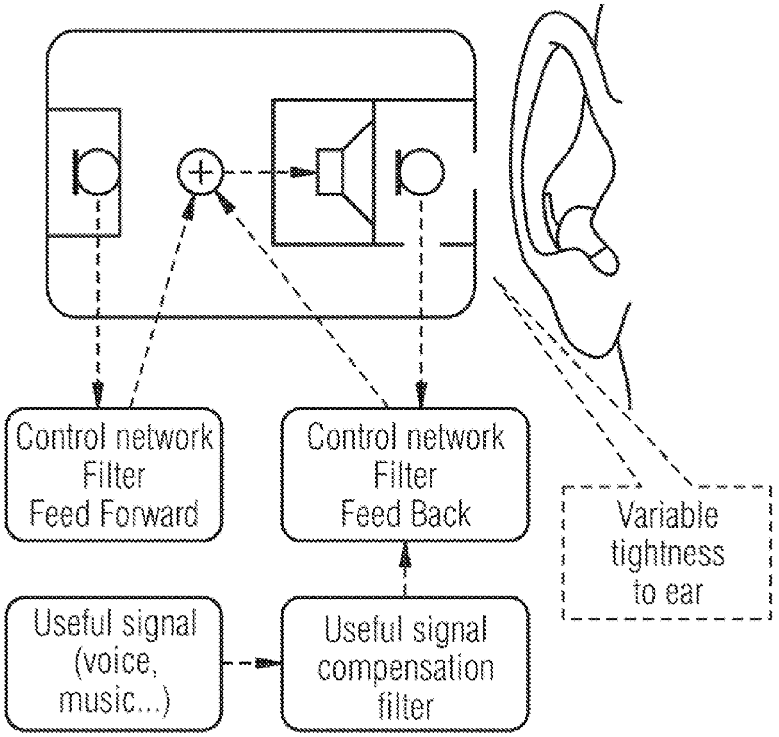
Figure 5:
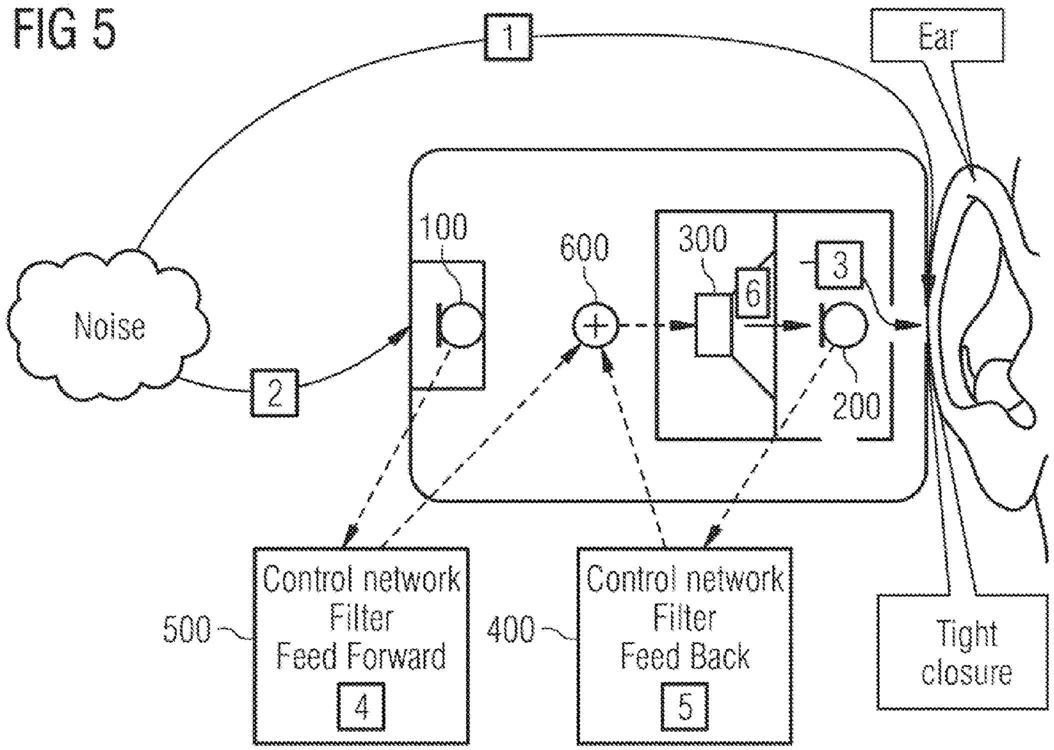
Figure 6:
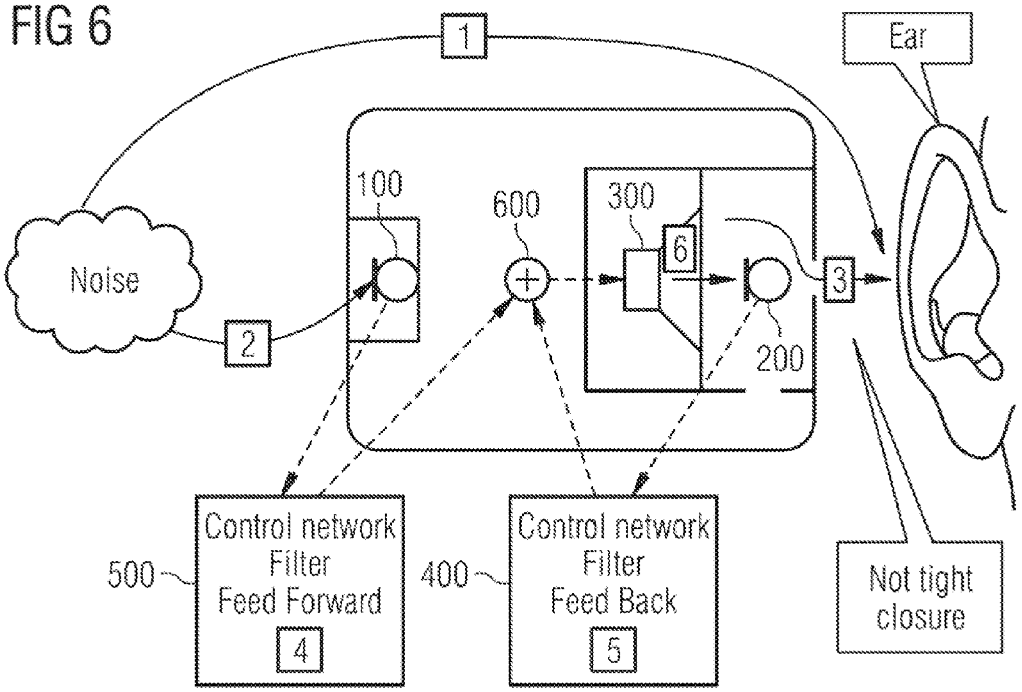
Figure 7:
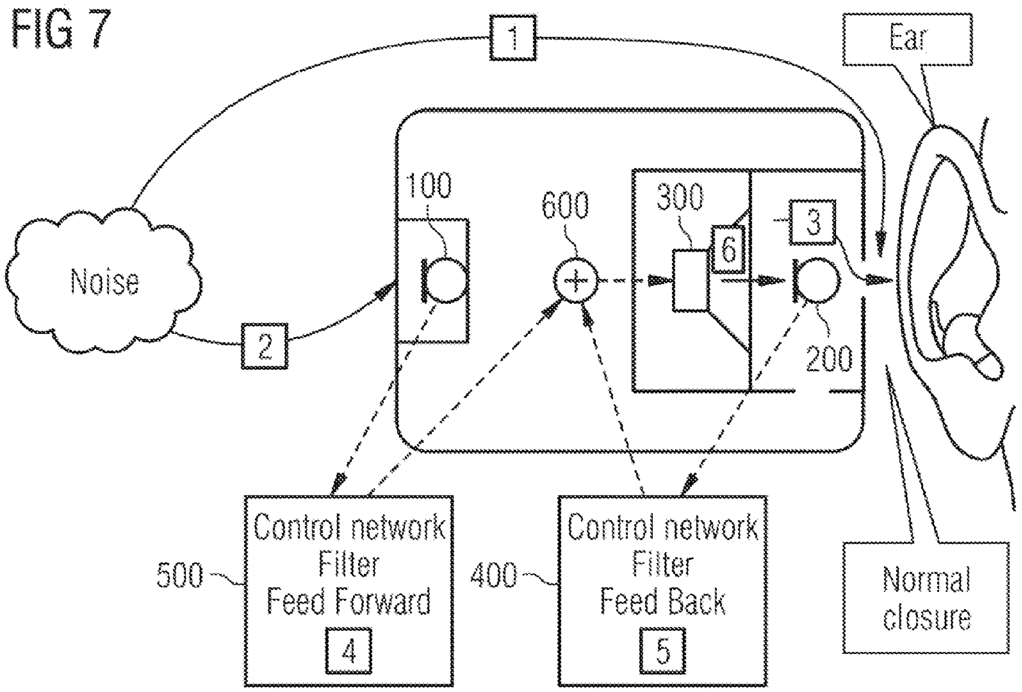
Figure 8:
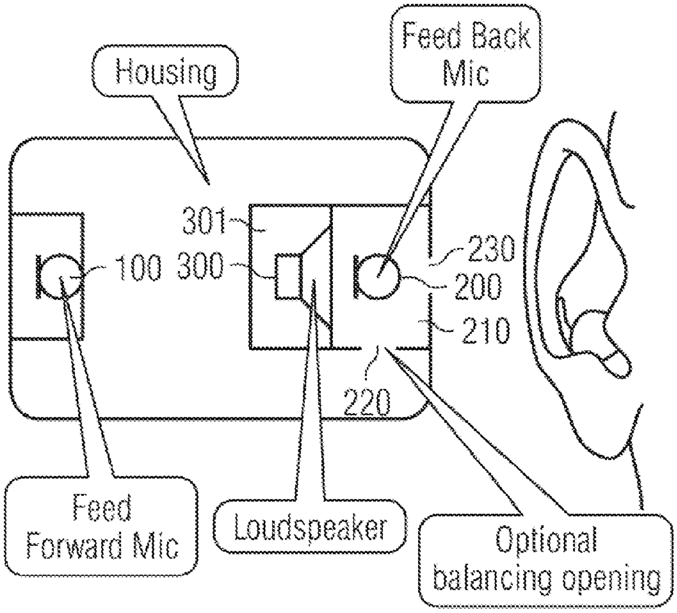
Figure 9:
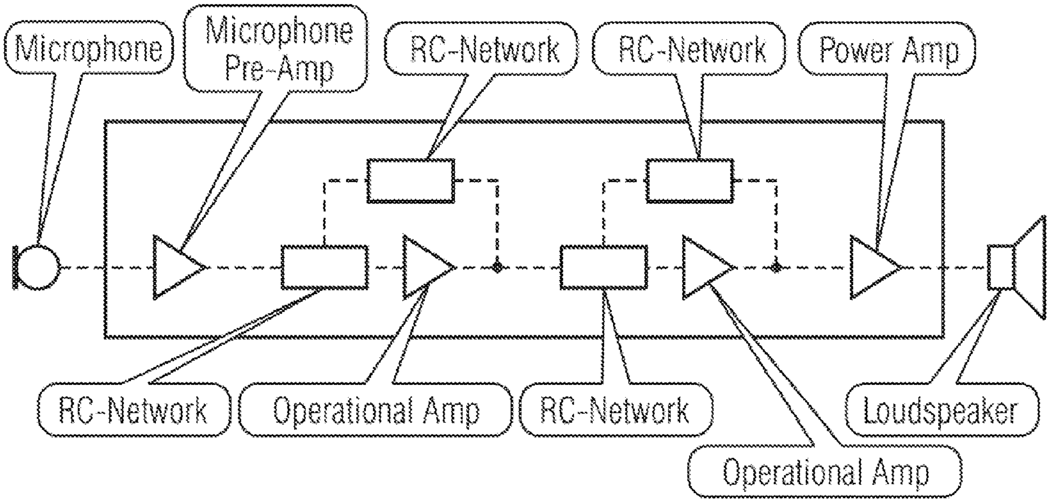

In these drawings:

FIG. 1 shows an overview diagram for elucidating the inventive principle,

FIG. 2 shows a system representation of a first embodiment of the inventive principle, FIG. 3 shows a frequency performance diagram of an active noise reduction in order to elucidate the improvement realized with a method according to the proposed principle, FIG. 4 shows a schematic representation of a second embodiment of the invention, FIG. 5 shows a schematic representation of the invention in a mobile telephone in a first user configuration, FIG. 6 shows a schematic representation of the invention in a second user configuration, FIG. 7 shows a schematic representation of the invention in a mobile communication device in another user configuration, FIG. 8 shows a design of a housing with a few elements of the control system according to the inventive principle, FIG. 9 shows a design of a feedforward or a feedback control according to the proposed principle, FIG. 10 shows a representation with a feedforward control at a fixed acoustic ratio, [and]

FIG. 11 shows a representation of a feedback control at a fixed acoustic ratio.

FIG. 1 shows a first embodiment of the inventive principle. The control system shown forms part of a mobile communication device or a headset and comprises a schematically illustrated loudspeaker housing 700. The loudspeaker housing 700 may be realized in the form of a headset housing with a padding 701. However, other housings that can be held against the ear of a user may also be considered for the loudspeaker 300. Potential loudspeaker housings 700 also include ear clips with corresponding ear mounts, which are inserted into the ear of a user. One common aspect of these housings is that they ensure a more or less tight seal relative to the ear of a user regardless of their design. The term "tight seal," as well as its meaning, is discussed in greater detail further below.

In addition to the loudspeaker arranged in the loudspeaker housing 700, the control system also comprises a microphone 200 in the vicinity of the loudspeaker. The microphone 200 forms part of a feedback control consisting of the control network 400 and the adding device 600. In this case, the control network 400 is connected to an input of the adding device 600. A second input of the adding device 600 is connected to a second control network 500. The second control network 500 forms part of the feedforward control and is connected to the microphone 100 on its input side.

The microphone 100 of the feedforward control is fixed on the underside of the loudspeaker housing 700 while the microphone 200 of the feedback control is arranged in the vicinity of the loudspeaker 300. The microphone 200 therefore captures the signal being output by the loudspeaker and delivers it to the feedback control and the control network 400.

The feedforward control and the feedback control with the two control networks 500 and 400 are respectively described separately below with reference to FIG. 1. The feedforward control functions in such a way that the microphone 100 receives external noise that also reaches the ear of a user via the loudspeaker housing. The received interference signal is delivered to the control network 500 that carries out a phase and amplitude compensation. This compensation is carried out in such a way that the received signal is shifted with respect to its phase position by 180° relative to the original noise over a relatively extensive frequency range. This inverted noise signal is additionally amplified in the control network 500 and then delivered to the loudspeaker. At an inverse phase position and a corresponding amplitude that is identical to the original noise signal, a destructive interference and therefore a suppression of the noise signal occur at the ear of a user.

Similarly, the feedback control also operates with the microphone 200 and the control network 400. The microphone 200 receives the loudspeaker signal of the loudspeaker 300, as well as the noise signal arriving through the loudspeaker housing, and delivers these signals to the control network 400. The control network 400 is structured similar to the control network 500 and comprises means for inverting the phase, as well as for a variable gain amplification. Accordingly, the loudspeaker once again outputs an inverted signal that destructively superimposes with the interference signal arriving through the loudspeaker housing 700.

The feedback control corresponds to a so-called open loop, in which the amplitude and the phase of the loudspeaker signal being output are measured. The inverse of the filter transfer function calculated therefrom corresponds to the ideal filter of the control network. Due to the time delay between the loudspeaker signal being output and the microphone, a complete phase inversion frequently does not take place such that a variable gain amplification needs to be dampened toward high frequencies in order to ensure the stability of the system.

According to the invention, it is proposed to jointly deliver the control signal of the feedforward control and the control signal of the feedback control to an adding device 600 that forms a sum signal thereof. This sum signal is delivered to the loudspeaker 300.

In this way, the feedback control also detects the first control signal of the feedforward control as a disturbance variable and can compensate this disturbance variable under certain circumstances. Consequently, the adding device 600 not only carries out a compensation of noise interference that is coupled into the microphone 200 via the housing 700 by means of the feedback control, but also a compensation of the controlled variable of the feedforward control being output by the loudspeaker 300 and therefore of the control network 500.

For this purpose, the feedback control and the feedforward control are tuned to different acoustic ratios. In other words, the feedback control operates optimally at a predefined acoustic ratio, at which the feedforward control essentially no longer functions or at least functions much weaker. Primarily the feedback control is decisive for the noise reduction at this acoustic ratio. The feedforward control accordingly is optimally tuned to a second acoustic ratio and causes an adequate noise reduction at this acoustic ratio. At this second acoustic ratio, however, the feedback control no longer functions sufficiently such that only the first controlled variable of the feedforward control is decisive for the noise reduction at the second acoustic ratio.

The optimal tuning of the individual control networks, as well as of the feedforward control and the feedback control, to the two different acoustic ratios is illustrated in FIGS. 5 to 7.

An acoustic ratio essentially refers to the influence of external parameters on the noise reduction. In a predetermined fixed loudspeaker housing, the acoustic ratio and, in particular, the quality of a noise reduction are primarily dependent on the tightness or the stability of an air volume between the loudspeaker and the ear drum of a user.

This fact is characterized by the so-called seal between the loudspeaker housing and the ear of a user. Stable acoustic ratios exist if a "tight seal" is produced, wherein the loudspeaker housing is arranged, for example, around the ear or against the ear of a user such that no air exchange takes place between an external volume and the air volume in the housing and the ear of a user. A "tight seal" is produced, for example, by headsets, the earpieces of which have a predefined shape and tightly adapt to the shape around the ear of a user.

Two different paths 1 and 2 essentially are decisive for noise interference as indicated in FIG. 5. The first path 1 is coupled to the air volume situated between the loudspeaker housing and the ear by means of the loudspeaker housing and the ear and thusly reaches the ear drum of a user. The second path 2 of the noise interference extends directly to the microphone 100 of the feedforward control. It is processed in the control network 500 of the feedforward control and delivered to the adding device 600. The adding device 600 delivers this signal to the loudspeaker 300 as a first controlled variable. The loudspeaker 300 radiates the noise signal into a predetermined and fixed, but simultaneously stable air volume ensured by the tight seal relative to the ear.

The microphone 100 of the feedback control now receives the interference signal being output by the loudspeaker that also comprises the first controlled variable together with the interference signal arriving via the path 1 and delivers this interference signal to the second control network of the feedback control. In this case, the tuning of the feedback control is realized in such a way that it is optimal when a tight seal is produced. When such a tight seal is produced, the feedback control and the variable gain amplification in the control network 400 therefore completely compensate a variable gain amplification of the feedforward control. Furthermore, an inversion of the received interference signal arriving via the path 1 is carried out, i.e., the loudspeaker 300 reproduces an overall signal obtained by reducing the amplitude of the phase-inverted interference signal arriving via the path 1 by means of destructive interference.

The very tight seal according to FIG. 5 consequently represents an extreme case and serves for tuning the feedback control such that a maximum noise reduction is carried out by the feedback control if this tight seal is produced. The variable gain amplification of the feedforward control that is not tuned for this case is compensated by the feedback control.

The other extreme case is illustrated in FIG. 6 in the form of an untight seal. In this case, a more or less variable distance exists between the ear of a user and the housing of the loudspeaker. The air volume is therefore undefined. Due to the non-existent seal between the ear and the loudspeaker housing, noise interference that reaches the ear of the user via the path 1 also is only slightly dampened. Since the seal relative to the ear is very untight, a very large amount of the sound energy of the loudspeaker is lost in this case without being captured by the microphone 200 of the feedback control. Accordingly, a controlled variable of the feedback control is only very small and hardly shows any effect.

The feedforward control is tuned for this case of a completely untight seal between the loudspeaker housing and the ear of a user. This feedforward control captures the noise interference arriving via the path 2 with its microphone 100 and delivers it to the control network 500. The control network 500 generates the first controlled variable thereof and this first controlled variable is delivered to the adding device 600 together with a second controlled variable of the feedback control that, however, is very small. The filter function of the feedforward control is tuned for this case such that the feedforward control operates optimally for the noise reduction if the loudspeaker housing is not tightly sealed. The feedback control only has a very slight effect due to the sound losses caused by the untight seal.

The seals illustrated in FIGS. 5 and 6 represent the extreme cases in the application of the inventive control system. If a completely tight seal is ensured, for example, by a firm contact pressure of the loudspeaker against the ear of a user or by a special headset shape, the feedback control shows the greatest effect possible while the feedforward control is mismatched for this application. If an untight seal is produced, i.e., at a large distance and a more or less variable air volume between the loudspeaker housing and the ear of a user, the feedback control shows no effect due to the sound losses and the noise compensation is achieved with the feedforward control tuned for this case.

However, the standard case lies between the two extremes and is referred to as a normal seal as illustrated in FIG. 7.

Both control networks and controls are active if this normal seal is produced. The seal relative to the ear is not completely tight in the embodiment according to FIG. 7, but also not as untight as in the extreme case according to FIG. 6. Consequently, an intermediate state of sorts is illustrated in this figure. The variable gain amplification and possible filters in the control network 500 of the feedforward control lead to an increased sound pressure in the path 3, i.e., in the loudspeaker housing. The reason[s] for this are the reduced sound losses occurring due to the improved tightness relative to the ear. This results in a slight mismatch of the feedforward control that manifests itself in an overcompensation of noise interference introduced via the path 1. This diminishes the noise reduction and may even lead to a noise amplification if the tightness of the seal increases. This overcompensation is now compensated by the feedback control. Due to the seal tighter than that illustrated in FIG. 6, more sound energy reaches the microphone 200 arranged in the loudspeaker housing. The received signal that also comprises the overcompensation of the feedforward control in addition to the noise interference in the path 1 is delivered to the control network 400. The control network now generates a second controlled variable that counteracts the overcompensation of the feedforward control. This is possible because the feedback control does not distinguish between the externally introduced noise interference and the overcompensated signal arriving from the loudspeaker. Consequently, the second controlled variable of the feedback control becomes larger as the tightness increases and compensates the first controlled variable of the feedforward control. Due to the suitable combination of feedforward control and feedback control and the tuning of both controls to different acoustic ratios, particularly a very tight seal and a very untight seal, a sufficient noise compensation can be achieved over a broad variable range of acoustic ratios.

FIG. 2 once again shows the system representation of the feedforward control and the feedback control in the form of a different view. The feedforward control comprises a control network 500 with three schematically illustrated components. The noise interference received by the microphone 100 is delivered to the control network 500 of the feedforward control 10. The control network 500 comprises one or more filters that essentially cause an inversion of the phase of the received signal by 180°. The second element 502 schematically shows the frequency response of the feedforward control. The control network 500 also comprises one or more variable gain amplifiers that are designed in such a way that the variable gain amplification increases in dependence on an increasing tightness. This is an inherent characteristic of the feedforward control because it does not contain any information on the tightness and the acoustic ratios. The feedforward control 10 therefore needs to be tuned to a predetermined acoustic ratio such as, for example, an open or untight seal.

The output of the feedforward control 10 is connected to an adding device 600, the output side of which is coupled to the loudspeaker 300. A second microphone 200 is arranged in the vicinity of the loudspeaker 300 and therefore captures passively dampened noise, as well as the signals being output by the loudspeaker 300. The microphone 200 is connected to the second control network 400 that forms part of the feedback control. The second control network also comprises several elements that are schematically illustrated. These include filter elements with a certain frequency response that serve for an inversion of the phase position. The control network 400 likewise features a variable gain amplification 401 that is dependent on the tightness of the seal of the loudspeaker relative to an ear of a user. The output signal of the feedback control is delivered to a second input of the adding device 600. During the operation of the feedback control, this feedback control now also detects the output signal of the feedforward control as a disturbance variable. Accordingly, it should compensate this disturbance variable signal, in particular, when the feedforward control causes an overcompensation due to a mismatch. This is the case, for example, if the feedforward control is tuned to an untight seal and the feedback control is tuned to a tight seal. In this case, an overcompensation of the feedforward control occurs due to the predetermined variable gain amplification and is compensated by the feedback control.

The efficiency of an active noise reduction is illustrated as an overall result in the diagram according to FIG. 3. The noise reduction itself is only effective over a predetermined frequency range. Furthermore, the feedforward control and the feedback control also differ with respect to the frequency range. Particularly the feedback control shows a slightly lower frequency range, in which an adequate noise compensation can be realized. The variable gain amplification of the feedback control needs to be reduced, in particular, at higher frequencies in order to ensure the stability of the system due to the delay time of the path between the compensated loudspeaker and the microphone of the feedback control. The curve KFF shows the individual frequency dependence of a feedforward control and the curve KFB shows the individual frequency dependence of a feedback control. Although the feedforward control is suitable for the noise reduction over a broader range, the feedback control clearly shows superior results in a narrower frequency band. A combination of the two controls results in the curve KK that essentially represents a superposition of the two aforementioned curves. Consequently, a significantly improved noise reduction in a frequency band is achieved due to this combination, wherein at least a noise reduction similar to a feedforward control can be simultaneously realized in a broader frequency range.

The invention therefore is particularly suitable for mobile communications, in which essentially variable acoustic ratios exist. For this purpose, it is possible to additionally couple a useful signal into the feedback control as illustrated in FIG. 4. This useful signal may consist, for example, of a voice signal, a music signal or the like. This coupling takes place, for example, in a variable gain amplifier in the control network of the feedback control and makes it possible to output the useful signal by means of the loudspeaker while simultaneously minimizing externally introduced noise interference. In addition to a direct coupling of the useful signal, this signal may also be filtered or specially processed in order to minimize interference of the useful signal due to the feedback control or the feedforward control. The two controls simultaneously ensure an adequate noise reduction, namely even at a variable distance of the loudspeaker housing from the ear.

FIG. 9 shows an exemplary control network for the feedforward control or feedback control, respectively. On its input side, the control network is connected to the corresponding microphone. It comprises a pre-amplifier that is coupled to a power amplifier arranged on the output side by means of the two RC network groups shown. The network groups respectively comprise RC networks with operational amplifiers that are connected in parallel and serve for carrying out an amplitude adaptation, as well as a phase inversion, of the applied and pre-amplified input signal. The RC network groups can be adjusted with respect to their transfer characteristic analogous to the amplification of the operational amplifiers. In this way, a predefined characteristic resulting from the loudspeaker housing and/or the microphone can be adequately imitated in order to achieve the desired phase inversion.

In order to suitably tune the feedback control to a predetermined acoustic ratio, it would be conceivable in one exemplary embodiment to merely carry out the tuning with respect to the loudspeaker housing or the corresponding mobile communication device. FIG. 8 shows a corresponding realization. In this case, a first microphone 100 is arranged in a housing of the mobile communication device on the opposite side of the loudspeaker. This microphone forms part of the feedforward control. The loudspeaker 300 itself is accommodated in a loudspeaker housing with a predefined, fixed first air volume. A second air volume 210 that also forms part of the housing of the mobile communication device is arranged in the radiating direction of the loudspeaker. In addition to an optimal compensation opening 220 and the central opening for outputting the loudspeaker signal 230, this auxiliary housing 210 also comprises the microphone 200.

In order to tune the feedback control, it is now possible, for example, to cover the central opening 230 such that a defined and fixed air volume results from the loudspeaker housing 301 and the auxiliary housing 210. The feedback control can now be tuned to this fixed air volume that simultaneously represents a very stable acoustic ratio by choosing the filters within the control network, as well as the amplification factors of the amplifiers, such that the maximum cancellation in the desired frequency range results. The feedforward control is tuned accordingly by removing the cover from the central opening 230.

If the central opening is held in the vicinity of or pressed against the ear of a user during the operation of the mobile telephone, the resulting acoustic ratio lies between the two extremes depending on the position. In this way, an adequate noise reduction is also ensured over a broad range.

I claim:

1. A closed loop control system for active noise reduction, comprising:

a loudspeaker for outputting sound;

an adding device that features a first and a second input and to which the loudspeaker is connected;

a feedforward control with a first microphone for receiving noise interference, and a first control network with at least one filter for forming a first controlled variable, wherein the first control network is coupled to the first microphone on its input side and is coupled to the adding device on its output side in order to supply the first controlled variable;

a feedback control with a second microphone for receiving a sound being output by the loudspeaker, and a second control network with at least one filter for forming a second controlled variable, wherein the second control network is coupled to the second microphone on its input side and is coupled to the adding device on its output side, wherein the feedback control is tuned to a noise reduction based on a first acoustic ratio, the feedforward control is tuned to a noise reduction based on a second acoustic ratio, and the second control network is designed for at least partially compensating the first controlled variable when the current acoustic ratios change in the direction of the first acoustic ratio, and wherein the tuning of the feedforward control and the feedback control is unchangeable at least during the operation of the control system.

2. The closed loop control system according to claim 1, wherein the first acoustic ratio corresponds to a first distance between the loudspeaker and an ear drum of a user and the second acoustic ratio corresponds to a second distance between the loudspeaker and the ear drum, and wherein the second distance is greater than the first distance.

3. The closed loop control system according to claim 1 or 2, wherein the first acoustic ratio corresponds to an essentially tight seal between the loudspeaker and an ear of a user, and wherein the second acoustic ratio corresponds to an untight seal between the loudspeaker and the ear.

4. The closed loop control system according to claim 1, wherein the first acoustic ratio corresponds to an essentially fixed air volume between the loudspeaker and an ear of a user, and wherein the second acoustic ratio corresponds to a variable, but at least significantly larger air volume between the loudspeaker and the ear than at the first acoustic ratio.

5. The closed loop control system according to claim 1, wherein the first acoustic ratio corresponds to a first extreme value of potential acoustic ratios and the second acoustic ratio corresponds to a second extreme value of the potential acoustic ratios.

6. The closed loop control system according to claim 1, wherein the first or the second control network has a variable gain amplification that is adapted to the respective acoustic ratio.

7. The closed loop control system according to claim 1, wherein the first or the second control network feature at least one series connection of a variable gain amplifier and an RC filter.

8. The closed loop control system according to claim 1, wherein the first and the second control network are based on an entirely analog control.

9. The closed loop control system according to claim 1, further comprising:

a loudspeaker housing that essentially encloses a first air volume and serves for accommodating the loudspeaker; and an auxiliary housing that essentially encloses a second air volume and is arranged in a preferred direction for the sound radiation of the loudspeaker housing.

10. The closed loop control system according to claim 9, wherein the auxiliary housing is designed for accommodating the second microphone.

11. The closed loop control system according to claim 9 or 10, wherein the second control network is tuned to a noise reduction that is based on the first and the second air volume.

12. The closed loop control system according to claim 1, wherein the feedforward control has a higher control bandwidth than the feedback control.

13. A method for active noise reduction for a loudspeaker that serves for the output of sound, the method comprising:

making available a feedback control for noise reduction that is tuned to a first acoustic ratio;

making available a feedforward control for noise reduction that is tuned to a second acoustic ratio; and compensating a controlled variable of the feedforward control with a controlled variable of the feedback control when current acoustic ratios change in the direction of the first acoustic ratio, wherein the tuning of the feedforward control and the feedback control cannot be changed at least during the control operation.

14. The method according to claim 13, wherein the first acoustic ratio corresponds to a first distance between the loudspeaker and an ear drum of a user, wherein the second acoustic ratio corresponds to a second distance between the loudspeaker and the ear drum, and wherein the second distance is greater than the first distance.

15. The method according to claim 13 or 14, wherein the first acoustic ratio corresponds to an essentially tight seal between the loudspeaker and an ear of a user, and wherein the second acoustic ratio corresponds to an untight seal between the loudspeaker and the ear.

16. The method according to claim 13, wherein the first acoustic ratio corresponds to an essentially fixed air volume an untight seal between the loudspeaker and an ear of a user, and wherein the second acoustic ratio corresponds to a variable, but at least significantly larger air volume between the loudspeaker and the ear than at the first acoustic ratio.

17. The method according to claim 13, wherein the first acoustic ratio corresponds to a first extreme value of potential acoustic ratios, and wherein the second acoustic ratio corresponds to a second extreme value of the potential acoustic ratios.

18. The method according to claim 13, wherein compensating step comprises:

detection of the controlled variable of the feedforward control as a disturbance variable by the feedback control.

19. The method according to claim 13, wherein making available the feedforward control comprises:

receiving noise interference;

amplifying the received noise interference;

filtering the received noise interference; and outputting the filtered noise interference, wherein the filtering is carried out in such a way that a cancellation of the noise interference is at least partially realized in a first range upstream of the loudspeaker with the filtered and amplified noise interference.

20. The method according to claim 13, wherein making available the feedback control comprises:

receiving noise interference in the region of the loudspeaker;

amplifying the received noise interference;

filtering the received noise interference in such a way that a cancellation of the noise interference is at least partially realized in a second range upstream of the loudspeaker with the filtered and amplified noise interference; and outputting the filtered noise interference.

* * * * *